United States Patent [19]

Crook

[11] Patent Number: 5,561,330

[45] Date of Patent: Oct. 1, 1996

[54] AUTOMATIC ELECTRIC POWER GENERATOR CONTROL

[76] Inventor: Gaines M. Crook, 7568 Chaminade Ave., Canoga Park, Calif. 91304

[21] Appl. No.: 364,263

[22] Filed: Dec. 27, 1994

[51] Int. Cl.⁶ ...................................................... F02N 11/08
[52] U.S. Cl. ............................ 290/30 R; 290/31; 322/11
[58] Field of Search ................................. 290/30 R, 30 A, 290/30 B, 31, 32, 34, 36 R; 322/11, 7, 8, 10

[56] References Cited

U.S. PATENT DOCUMENTS

| | | |
|---|---|---|
| 1,605,243 | 11/1926 | Knapp et al. . |
| 1,736,865 | 11/1929 | Starr . |
| 1,903,712 | 4/1933 | Spaink . |
| 2,384,135 | 9/1945 | Scherry . |
| 2,427,462 | 9/1947 | Kaelin . |
| 2,477,714 | 8/1949 | Baer . |
| 2,510,891 | 6/1950 | Hurlburt . |
| 2,579,130 | 12/1951 | Swam . |
| 2,611,877 | 9/1952 | Walters . |
| 2,762,933 | 9/1956 | Foxcroft . |
| 2,810,079 | 10/1957 | McFarland . |
| 2,916,634 | 12/1959 | McFarland . |
| 3,518,445 | 6/1970 | Wichman . |

Primary Examiner—Bentsu Ro
Attorney, Agent, or Firm—Don A. Hollingsworth

[57] ABSTRACT

A controller operates to start an electric power generator, for example a gasoline engine electric power generator, when a demand is made for electric power when the user turns on an electric powered device, such as a circular saw, that is to be used. The generator runs as long as there is a demand for power, and when the demand ends, the generator stops after a predetermined adjustable delay period. Additionally, in the event the engine is to be started under cold start-up conditions, the starter is operated to avoid cyclical starting/stalling of the generator engine. When a demand is made on the generator for power, the controller senses a circuit closure, turns on the starter of the generator, and, after the generator cranks, the power is applied to the saw and it starts to operate. The starter is controllably disabled after the generator is operational. The engine driving the generator will stop after a predetermined delay after the power demand is removed. If the user switches off the saw for a short time and then turns it on again before the delay times out, then the timing sequence (to shut the generator off temporarily) is aborted. If, however, the user stops sawing longer than the timeout period, the generator is stopped, and it will automatically start again when the user is ready to saw again.

16 Claims, 7 Drawing Sheets

5,561,330

AUTOMATIC ELECTRIC POWER GENERATOR CONTROL

BACKGROUND OF THE INVENTION

1. Field of the Invention

This invention relates to a controller for operating, on demand, small electric power generators, and more particularly to a controller for a small gasoline engine driven electric power generator, such controller designed to operate the electric power generator more efficiently, thereby conserving energy resources and extending the useful life of the generator.

2. Brief Description of the Prior Art

Controlling the operation of a gasoline-engine-operated electrical power generator in a variety of ways is known in the art. For the purposes of this description, the term "generator" is applied to the whole machine, and the term "alternator" is applied to the part of the machine which generates the alternating current (AC) power to be supplied externally. There are a number of patents which deal with automatic voltage regulators for a wide variety of generators for vehicles, aircraft, and others. Among these are U.S. Pat. Nos. 2,992,382; 4,184,083; 4,661,760; 4,749,944; 4,931,717; and 4,933,623. Also known are systems for controlling electric arc welders by starting the prime mover for the welding generator when the stinger is grounded to the work piece. Among these are U.S. Pat. Nos. 2,170,861; 2,237,894; 2,412,745; 2,419,276; 2,427,127; 2,480,635; 2,499,635; and 3,748,561. One of these, 2,412,745, was issued to David Packard, co-founder of the Hewlett-Packard Co.

U.S. Pat. No. 2,201,863 is an odd type of controller for a three phase wound rotor motor which is controlled in response to the number of times the load is cycled on and off.

U.S. Pat. No. 1,481,919, issued in 1924, is a rather complex system which is used with a 32 Volt DC farm power system in which a motor generator set driven by a 32 V DC motor and a generator having a "standard" voltage. The motor generator set also acts as a starter motor for the 32 V generator's engine.

U.S. Pat. No. 2,427,462 (issued Sept. 16, 1947 to H. F. Kaelin) discloses a system which is sensitive to a load on the generator. The Kaelin patent was applied for May 14, 1945, so that comparing it with the controller of the present invention is somewhat difficult because of the 50 year technology gap between the two, as well as because the two are designed with different system concepts in mind for starting a generator. The Kaelin system was designed to be used in conjunction with the "Startex" or similar system which is required to actually start a generator and allow it run as long as a circuit closure is maintained.

The schematic of '462 is redrawn in the accompanying FIG. 1 using modern terms, so that it can be explained easier. The apparatus of the Kaelin patent merely senses a load and closes a relay when there is a load present on the generator and activates the generator engine. When the load is removed, the generator stops. Without the supplemental "Startex" system, it has no capability of starting the generator's engine, let alone differently under different environmental conditions, and provides no delay in opening the contacts of the relay after the load is removed, and is devoid of a number of features which are desirable and essential in today's competitive industry. According to the text of the patent, it was intended to be used with the "Startex" or other controller which starts the generator engine when an external circuit is closed and stops it when the external circuit is opened. An explanation of the operation, according to the schematic of FIG. 1, follows.

One lead 3 of the coil of relay K1 is permanently connected to the hot terminal of the battery 5. When a load 4, 6, and/or 8 is placed upon the generator output load terminals 9, 9', the other lead 11 of the coil of K1 is connected through the closed contacts 5 and 6 of relay K2, to ground through the load, and thence back to the other terminal of the battery 5, energizing and closing the contacts 7 of relay K1. This starts the engine by means of the other controller with which it is associated (not shown). When the engine starts and the generator 13 produces output power, the coil of relay K2 is energized by the generator output power, connecting contacts 1 to 2 and 4 to 5. Current being supplied to the output load terminals 9, 9' flows through the primary of the current transformer 15 and produces an output which is connected to the coil of relay K1, holding it closed as long as there is a load on the generator power output load terminals 9, 9'. When all loads are removed, current through the primary of current transformer 15 ceases, and the secondary of current transformer can no longer supply power to the coil of K1 which then opens contacts 7 to deenergize the generator 13.

It should also be noted that it would be difficult or impossible to find a relay which would function optimally or even satisfactorily from an AC current transformer as well as from a low level DC source.

SUMMARY OF THE INVENTION

The controller according to the present invention operates to start the generator when a demand is made for electric power when the user turns on the electric powered device that is to be used. The generator runs as long as there is a demand for power, and when the demand ends, the generator stops after a predetermined adjustable delay period. Additionally, in the event the engine is to be started under cold start-up conditions, the starter is operated to avoid cyclical starting/stalling of the generator engine.

The unit operates as follows. When a demand is made on the generator for power, for example if a carpenter is using the generator to operate a portable electric handsaw at a building site and gets ready to saw, he turns on the switch of the saw. The controller senses the circuit closure, operates the choke of the generator, turns on the starter of the generator, and, after the generator cranks, the power is applied to the saw and it starts to operate. The starter is controllably disabled after the generator is operational. Under most circumstances, after warm-up, starting is only a matter of two or three seconds. The engine driving the generator will stop after a predetermined delay after the power demand is removed. If the carpenter has many cuts to make and only needs to reposition his saw to make the next cut, then the delay period will likely not be long, the demand on the generator returns before the delay times out, and thus the generator operates continuously. That is, if he starts the saw again before the timeout delay time expires, then the timing sequence (to shut the generator off temporarily) is aborted. If, however, he must get more lumber and position it for a cut, perhaps he would just let the generator time out and stop, and it will automatically start again when he is ready to saw again.

In developing the invention, two compete controllers were built and tested. A "breadboard" unit was built and connected to a Dayton brand 4 KW generator and a prototype was built to be connected to a Honda EM5000SX 5 KW generator. The one on the Honda is much more sophisticated and is a plug-in version that can be added without changing the generator in any way. The controller interfaces with the power output receptacle and the remote control connector and will operate in all modes provided by the generator, such as 120 V output only, 120 V–240 V output, and with the "Auto Throttle" feature on or off. The Auto Throttle feature is a feature on some Honda generators which will slow the engine down to a fast idle when the load is removed.

The object of both the Kaelin system and that of the present invention is to start the generator engine and provide power when a load is connected to the generator. Both sense that a load is present by monitoring for ohmic closure of the load circuit, either directly or indirectly with a relay or relays. Even though both systems sense the demand for power by sensing an ohmic continuity across the power load path, they do it in a different manner. The Kaelin system uses two relays in operation. The sense relay is used in actual sensing the presence of a load, and it remains closed during the whole time the generator is delivering power. The power relay is separate from the sense relay and is closed only during powered operation. In the system according to the present invention, the sense path utilizes the back contacts of the power relay when it is not energized, but only those contacts which are not used during the power phase are connected to the controller. This is an isolation safety feature which is essential to meet certain governmental restriction requirements. The two systems do two fundamentally different things to accomplish the same goal of starting the generator. The whole purpose of the Kaelin system is to close one pair of contacts while a load is present, whether power is being delivered or not. The system of this invention includes the complete functions of sensing, starting the generator, monitoring for power unloading, delaying, aborting delays upon return of demand, and stopping the generator, and also that of providing a means of transitioning from one operational state to another.

The present invention can easily be adapted to any electric power generating source to control the operation of the generator dependent upon the nature of the load demand. For example, future electric power sources will include nuclear reactors, controlled fission/fusion processes, and the like. Thus, although a gasoline engine driven electric power generator is exemplary of the type of generator the present invention can control, it is to be understood that the invention is not so limited and can be employed in any electric power generating system in which the power generator is to be shut off, put into an idle mode, or otherwise affected responsive to the demand for electric power output demand.

BRIEF DESCRIPTION OF THE DRAWINGS

The invention will now be described in detail, having reference to the accompanying drawings in which.

DETAILED DESCRIPTION OF THE PREFERRED EMBODIMENTS

Figure 1:
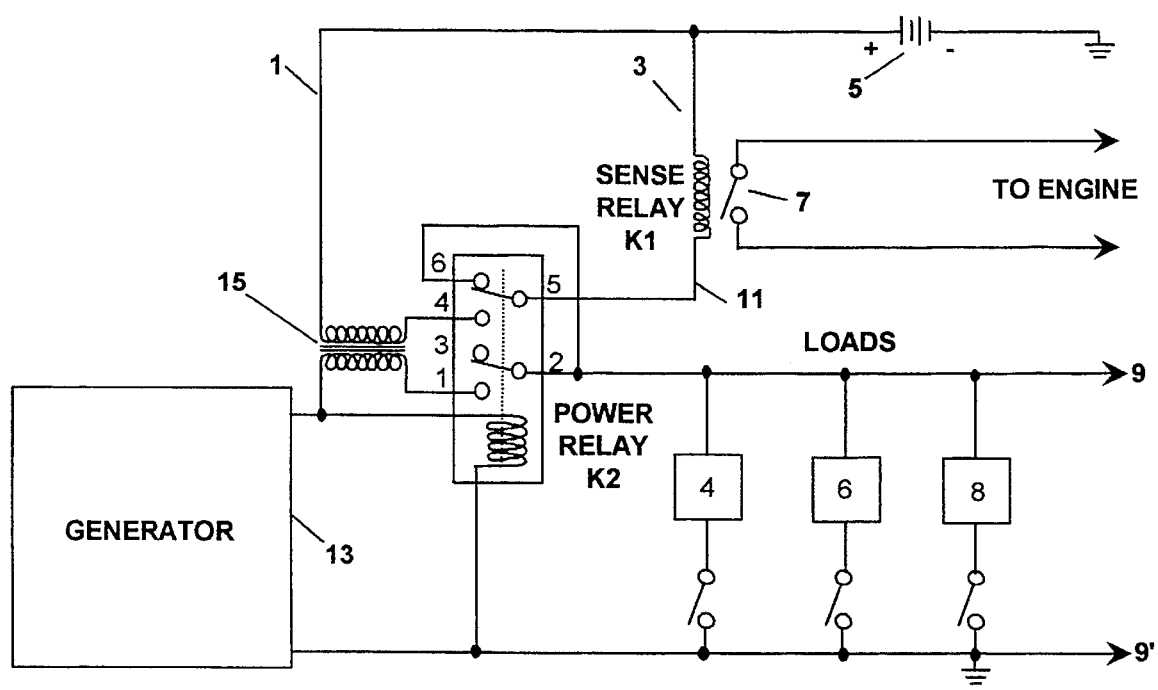
FIG. 1 is a simplified schematic diagram of the electrical components of a prior art controller for a gasoline engine driven electric power generator.
Figure 2:
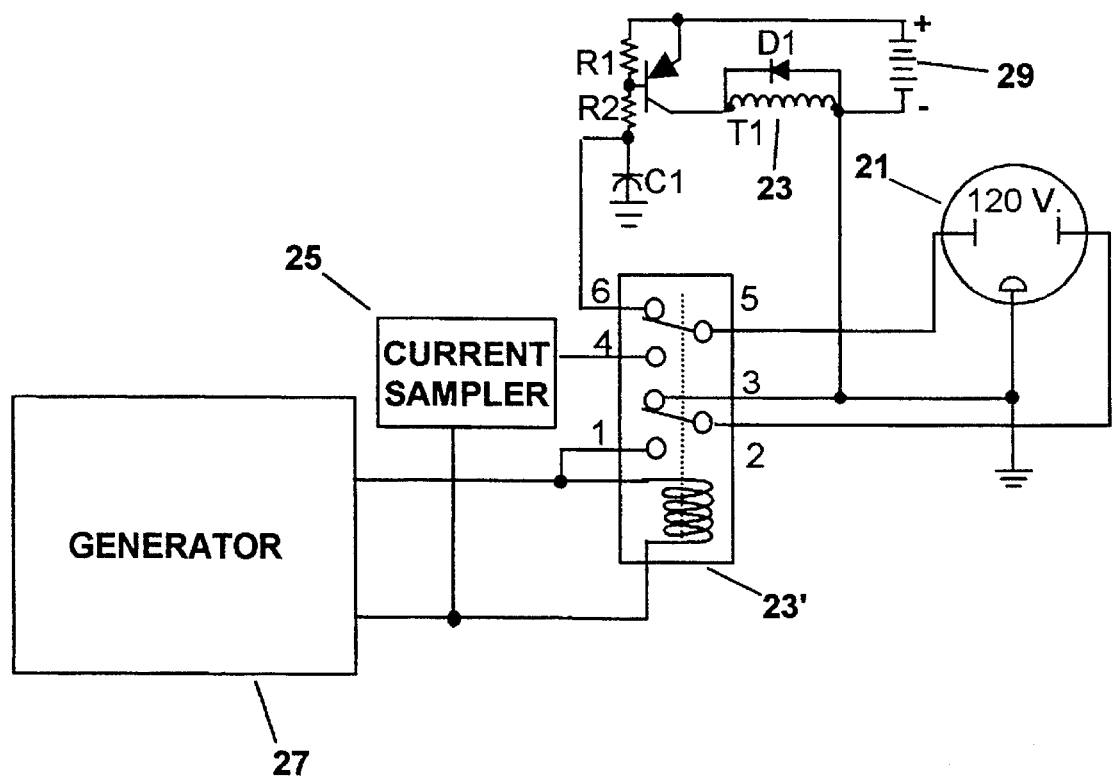
FIG. 2 is a simple embodiment of the basic controller for a gasoline engine driven electric power generator according to the present invention.

Referencing FIG. 2, the simplest form of the present invention is depicted. Only one powered receptacle 21 (a 120 VAC receptacle) is shown for simplicity. When a load, such as an electric saw, is plugged into the receptacle 21, an electrical path is formed from the positive side of battery 29, through the base of Transistor T1, through resistor R2, through contacts 6,5 of power relay 23', to ground, and returned to the negative side of battery 29. This turns on T1 which applies battery power to starter solenoid 23, and the engine (not shown) of the generator 27 starts. Build up of electrical power from generator 27 eventually activates power relay 23' closing contact sets 4,5 and 1,2. That is, contacts 6,5 open, contacts 5,4 close, contacts 3,2 open, and contacts 2,1 close. This routes generator power to the power receptacle 21, replacing battery power.

Under this condition, the current delivered to the load passes through current sampler 25. When the saw is turned off, the current through sampler 25 drops. This current drop is sensed, and according to a predetermined sequencing scheme, the generator is shut off, and the power relay 23 is thus deenergized reconnecting contacts 6,5 and 3,2. Since R1 is reverse biasing the base-emitter junction of T1, T1 remains off, and the system is readied to again sense the low resistance of the saw in order to again turn on T1 and repeat the cycle. Diode D1 is provided to dissipate high voltage transients across the starter solenoid 23.

Figure 3:
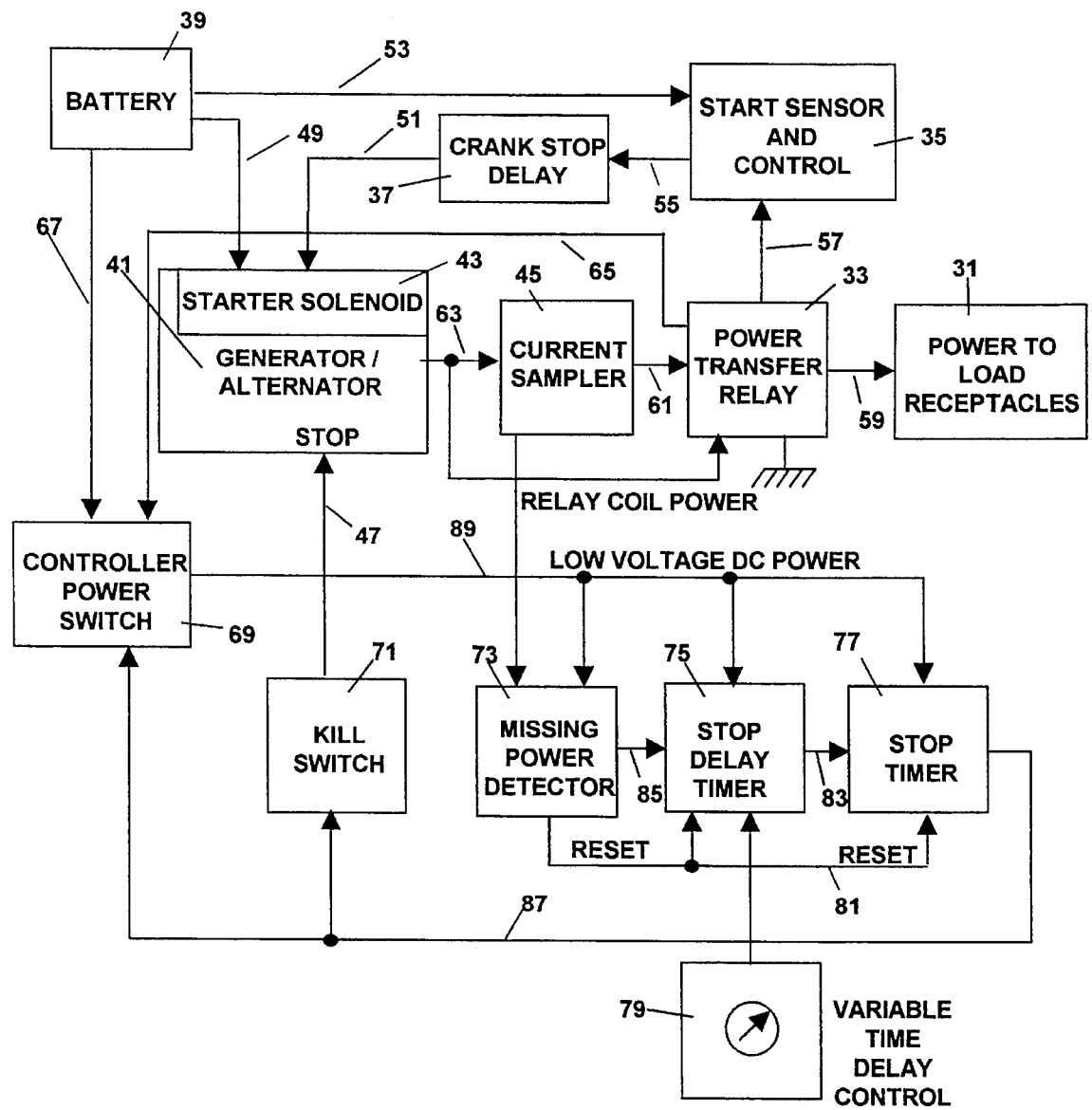
FIG. 3 is an electronic block diagram of the functioning of one embodiment of the controller according to the present invention.

Reference is now made to the block diagram of FIG. 3, starting with the block 35 marked "START SENSOR AND CONTROL". Virtually all AC powered devices have DC ohmic continuity when turned on. This ohmic continuity is what is used to sense when the load is ready to receive power. In the unpowered state, the power transfer relay 33 interrupts the path between the alternator output 63 and the power to load receptacles 31 and routes the receptacle conductors which normally are connected to the alternator output 63 to the start sensor and control function 35. The start sensor and control 35 includes the circuitry to energize the starter solenoid 43 from the battery 39, and when ohmic continuity is sensed the generator 41 starts. Once the starter starts the engine, the generator/alternator starts to generate power and the power transfer relay 33 is pulled in, which disable the start circuitry and energizes the load. There is a slight delay in interrupting the operation of the starter after the power transfer relay 33 pulls in, in order to make sure the engine is running properly to prevent stalling when it is cold. This is represented by the block 37 marked "CRANK STOP DELAY". This prevents undesirable startup cycling, where the electric power load would be sensed and the engine started; and when the power transfer relay 33 energized, the starter would cut off, the engine would stall, the relay 33 would drop out, the starter would start again and sometimes it would take several false starts to actually get the generator into operation.

Once power is flowing, the generator operates as if the controller did not exist. The current sampler block 45 between the alternator 41 and the relay 33 samples the current drawn by the load, so the controller will know when the load is interrupted. Since the current sampler is taken from a power line with a voltage of at least 120 V AC, some sort of voltage isolation must be provided between the current sampler 45 and the electronics to which the sample is fed.

The output of the current sampler 45 goes to the missing power detector block 73 and as long as power is being used, the generator operates without the assistance of the controller. If the power to the load is switched off (e.g., the powered device is turned off), the missing power detector immediately senses the loss of load and starts the stop delay timer 75 timing out. The purpose of the stop delay timer 75 is to delay the stopping of the engine after the load is removed to allow the user to complete operations which he might need to accomplish before he uses power again. When the stop delay timer 75 times out, the stop timer 77 is started. The variable time delay control 79 on the stop delay timer 75 allows the user to set the timeout time to suit his own purposes.

If the load is again reconnected before timeout is complete, the output of the missing power detector again produces output which is fed through the reset line 81 and resets the timers 75, 77 to the untriggered condition. The aborting of a timeout is an important function, because the only reason for the delay is to give the user a chance to reapply power before the engine stops. This increases efficiency and reduces wear and tear on the generator.

The stop timer 77 produces an output which causes those operations which are necessary to stop the engine. This output 87 must be preset for a period which is longer than it takes the engine to stop. Some engines take longer to stop than others.

The function of the kill switch 71 is to stop the engine. In the simplest case it can be a switch or relay connected across the coil primary of the engine shorting the coil and eliminating the ignition spark. Engines may also be stopped by a fuel shutoff solenoid valve or a combination of the two methods.

There is also another function required which is not obvious at first glance. In the process of stopping the engine, when the alternator output voltage diminishes to about 70 volts, the power transfer relay opens. In one version of the controller, the controller received its DC power through an auxiliary contact on the power transfer relay 33. Since the kill switch is electronic, when the relay 33 opened in the process of stopping the engine the controller lost power, the kill switch stop circuit 71 stopped operating and the engine started up again, went back into a stop sequence, timed out and shut down, in an endless sequence. To prevent this, an improved design contains an electronic power switch 69 which maintains controller power through the end of the stop sequence, even after the relay 33 opens. The power switch 69 has two activating inputs. The first input 65 is the closure of the power relay 33, and the second input 87 is the output of the stop timer. As long as the stop timer output is high, there will be DC power applied to the controller electronics on line 89, and this lasts until after the engine actually stops.

It should be noted that without the delay in starter cutoff after the relay is energized and the delay in interrupting the controller DC power during the stop sequence after the power relay opens, the system would have two unconditional instabilities which would render it useless.

Figure 4:
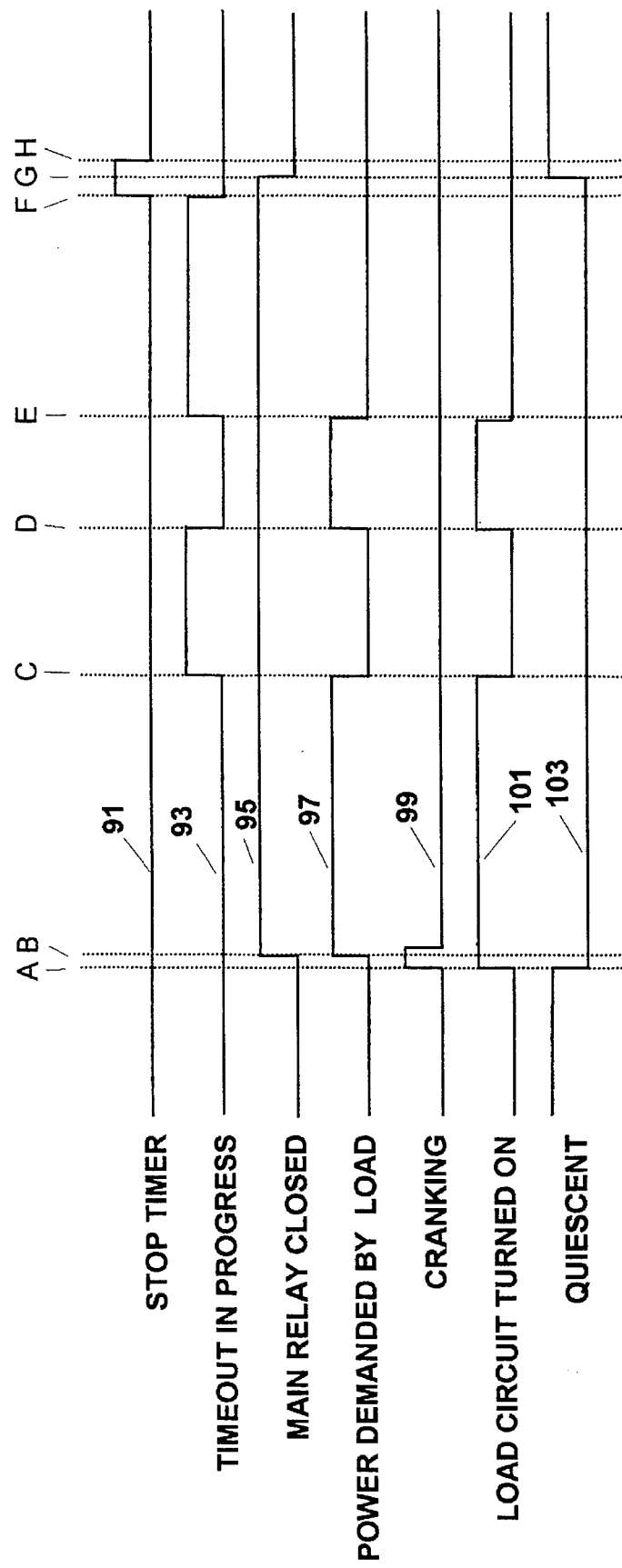
FIG. 4 is a function diagram showing the sequencing of major operational events in the starting up, maintaining, and shutting off of the generator.

To review the operational process of the controller of FIG. 3, reference is made to the waveform function diagram of FIG. 4. Each one of the lines of the figure represents the function named to the left. During the quiescent period denoted by waveform 103, nothing is happening. When the load circuit is turned on at point A as shown by waveform 101, the generator begins to crank (waveform 99). The time to crank depends on whether the engine is hot. It is to be noted that the cranking period extends a short time after the power is supplied to the load (waveform 97) to prevent stalling. Power is applied at point B and continues to be supplied to the load until it is turned off at point C. At this point, power is still available through power transfer relay 33, but the load is turned off, so timeout starts (waveform 93) and continues to point D when the load is again turned on and the timeout is aborted. The load is again turned off at point E starting a timeout that is complete at point F. The stop timer circuit 77 then becomes active, stopping the engine. Notice that the main power transfer relay 33 drops out at point G, but the stop circuit stays active until point H at which point the engine has completely stopped.

Figure 5:
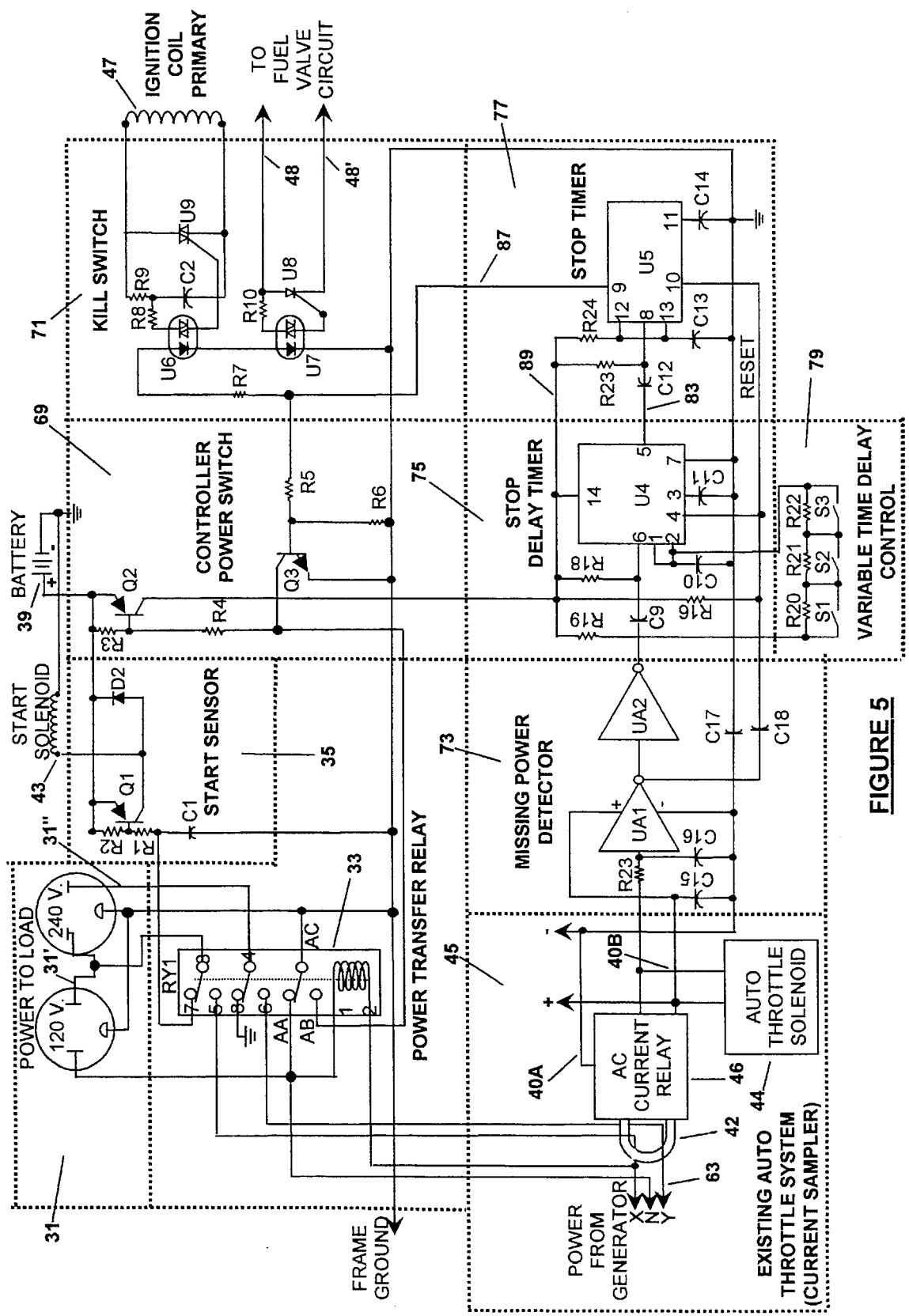
FIG. 5 is an electronic schematic diagram of the functioning of a first preferred embodiment of a controller according to the present invention using a current relay to sense current.

Reference is now made to the schematic of FIG. 5, starting with the block marked "START SENSOR" 35. When resistor R1 is grounded through contacts 3 and 7 of relay 33, due to the relatively small resistance of the load, Q1 turns on and energizes the starter solenoid 43. That is, when the power switch of the load connected to the 120 V power receptacle 31 is turned on, the hot terminal 31 of the 120 V power receptacle is connected through relay contacts 3 and 7 to R1. The neutral N of the 120 V receptacle connects through auxiliary relay contact AA to AC and to frame ground. This energizes the start solenoid 43 which results in the engine starting. If one desires to use a 240 V load and turns on the switch of a load connected to the 240 V receptacle 31, one hot terminal 31' of the 240 V receptacle goes through relay contacts 3 and 7 to R1. The other hot terminal 31" of the receptacle 31 goes through contacts 4 and 8 to ground which also starts the engine. The function of resistor R2 is to limit the current to the base of Q1 (thereby limiting its gain) which is a Darlington power transistor with a beta of over 2000. The value of R2 and the ratio of R2 to R1 set the sensitivity of the start sensor 35. The larger the value of R2 and the smaller the value of R1, the greater the sensitivity. A value of 75 ohms for R2 works well. The function of diode D2 is to protect Q1 from inductive flyback transients.

Once the starter starts the engine, the alternator 41 (FIG. 3) starts to generate power, and the relay 33 is energized by the generated power. This disables the start circuitry and energizes the load. The capacitor, C1, keeps the starter going for a short period after the relay 33 pulls in to prevent stalling under cold or long term start conditions.

Once power is flowing, the generator 41 operates as if the controller did not exist. The "CURRENT SAMPLER" block 45 between the alternator 41 (not shown in FIG. 5, but reference FIG. 3) and the relay 33 samples the current drawn by the load so the controller will know when the load is interrupted. In the preferred embodiment of the invention a current operated relay 46 as shown in FIG. 5 is used. Several of the generators presently sold by Honda, Yamaha, and Makita under their various trade names have features in which the engine reduces speed to a fast idle when the load is removed. The removal of the load is sensed by what is termed a current operated relay 46. Honda calls the unit in their model EM5000SX an "Auto Throttle Controller" 44. It is a sealed unit which is supplied with DC power, and the AC power conductors from which the current is to be sensed, loop through a magnetic core 42 protruding from the unit. It should be noted that on FIG. 5 the two AC conductors loop through the core 42 in different directions from the source. The reason for this is that the instantaneous polarities of the two branch circuits of the alternator are opposite. When the sampled current falls below a threshold point (indicating a power of somewhat less than 100 watts), contact is made within the unit to apply DC to an external solenoid 44. When activated, the solenoid plunger presses against a part of the engine governor linkage and slows the engine down from the normal 3600 rpm to about 2200 rpm. The voltage isolation between the high voltage AC power conductors and the electronics is provided in this case by the wire insulation on the conductor which is routed through the magnetic core.

In the embodiment shown, the existing auto throttle controller switch closure (not shown) within the sealed AC current relay 46 is used to energize the solenoid 44 to slow the engine down when the load is removed and to also signal the controller that power flow has stopped. The auto throttle controller switch within AC current relay 46 is arranged so that the negative side 40b of the solenoid power is switched to connect with the negative side 40a of the power source, and the positive side is always connected to the + of the power source.

Reference is made to the block in FIG. 5 labeled "MISSING POWER DETECTOR" 73. The input of a CMOS Schmidt trigger, UA1 inverter, through a noise filter consisting of R23 and C16 is connected to the negative side of the solenoid 44. When the solenoid 44 is not operating, the inverter UA1 receives a high input through the solenoid 44, and its output is low. When the solenoid 44 is energized, the inverter UA1 input goes low and its output goes high. The output of UA1 is connected to a second inverter UA2. When the solenoid 44 energizes, the output of UA2 goes low and triggers the stop delay timer U4, through C9, and starts the timeout process. The stop delay timer 75 in this design uses a 555/556 type IC analog timer U4. Other types of timers, including digital timers, may be used. Timer U4 produces a positive going output during the timeout period of which the negative going trailing edge can trigger a second timer, stop timer 77. The delay period of U4 is established by C10 and a combination of resistance of R19, R20, R21, and R22 and the setting of dip switches S1, S2, and S3. With a 10 Mf capacitor for C10 and three dip switches, with resistors proportioned binarily and a 0.75 MW resistor R19 always in the circuit, one can achieve nominal delays of 8, 25, 41, 58, 74, 91, 107, and 126 seconds of delay. One minute has been found to be a practical time in actual usage.

If the load is connected again before timeout is complete, the output of UA1 goes low again and is coupled to the reset bus of U4 and U5 through C18 to abort the timing sequence.

It should be noted that the common power lead of the Auto-Throttle system 45 is coupled to the ground of the controller with a capacitor C15. This is because the Auto Throttle solenoid 44 is powered by a battery charger output of the generator 41 which is isolated from the frame ground. The inverters UA1 and UA2 are also powered by this source (on line 89), therefore the output pulses must be coupled capacitively.

The stop timer is another timer U5 similar to the stop delay timer U4. It is triggered by the stop delay timer output 83 and produces an output signal for a period as long as it takes to stop the engine. Its output is connected to the input of the kill switch 71.

The function of the kill switch 71 is to stop the generator engine. In the simplest case, it can be a small (TO-92 case) triac thyristor U9 with its main terminals connected across the coil primary 47 and triggered continuously during the stop sequence by the kill switch stop timer 77. If triggered, it functions to fire each time a voltage appears across it, shorting the coil and eliminating the ignition spark. The component arrangement of the kill switch optical isolator U6 and the triac U9 itself is a circuit recommended by the Motorola data book for inductive loads except that C2 had to be drastically reduced in value because of the higher dv/dt of the coil pulses. Some of the more sophisticated generators also incorporate a fuel cutoff solenoid (not shown) powered from a source isolated from frame ground. In this case, the stop timer 77 drives two opto-isolators U6, U7 with triac outputs U9, U8 with their input LEDs in series, driven by the output of the stop timer 77. One isolator output then drives the coil shorting triac U9 and the other drives an SCR U8 which energizes the fuel cutoff solenoid over lines 48, 48' for the duration of the stop sequence. The SCR circuit is straightforward. The opto isolators U6, U7 isolate the wiring of the two thyristors U9, U8 from frame ground so there is no undesirable interaction between the power source for the fuel value solenoid and frame ground. In generators which have no fuel cutoff solenoid, the second opto-isolator and the SCR are eliminated.

The controller power switch 69 operates as follows, referencing FIG. 5 for the schematic of the switch. It is composed of Q2, Q3, R3, R4, R5, and R6. The generator controller of the present invention becomes active when the alternator starts producing power and the relay 33 is energized. At this time, relay contacts AB and AC close, and the junction of R4 and the collector of Q3 is grounded. This causes current from the battery 39 to flow into the emitter of Q2 out the base, through R4 to ground, turning on Q2 and powering up the controller with battery power. When the stop timer output 87 goes high and the stop sequence begins, Q3 is saturated by current from the output of stop timer 77. This means that as long as the stop timer output 87 is high, Q3 will be saturated and the controller will be powered up, even after the relay 33 has opened and R4 ungrounded by its contacts. The two transistors Q2 and Q3 are low speed switches with betas of about 100. The controller uses a maximum current of 60 ma.

Figure 6:
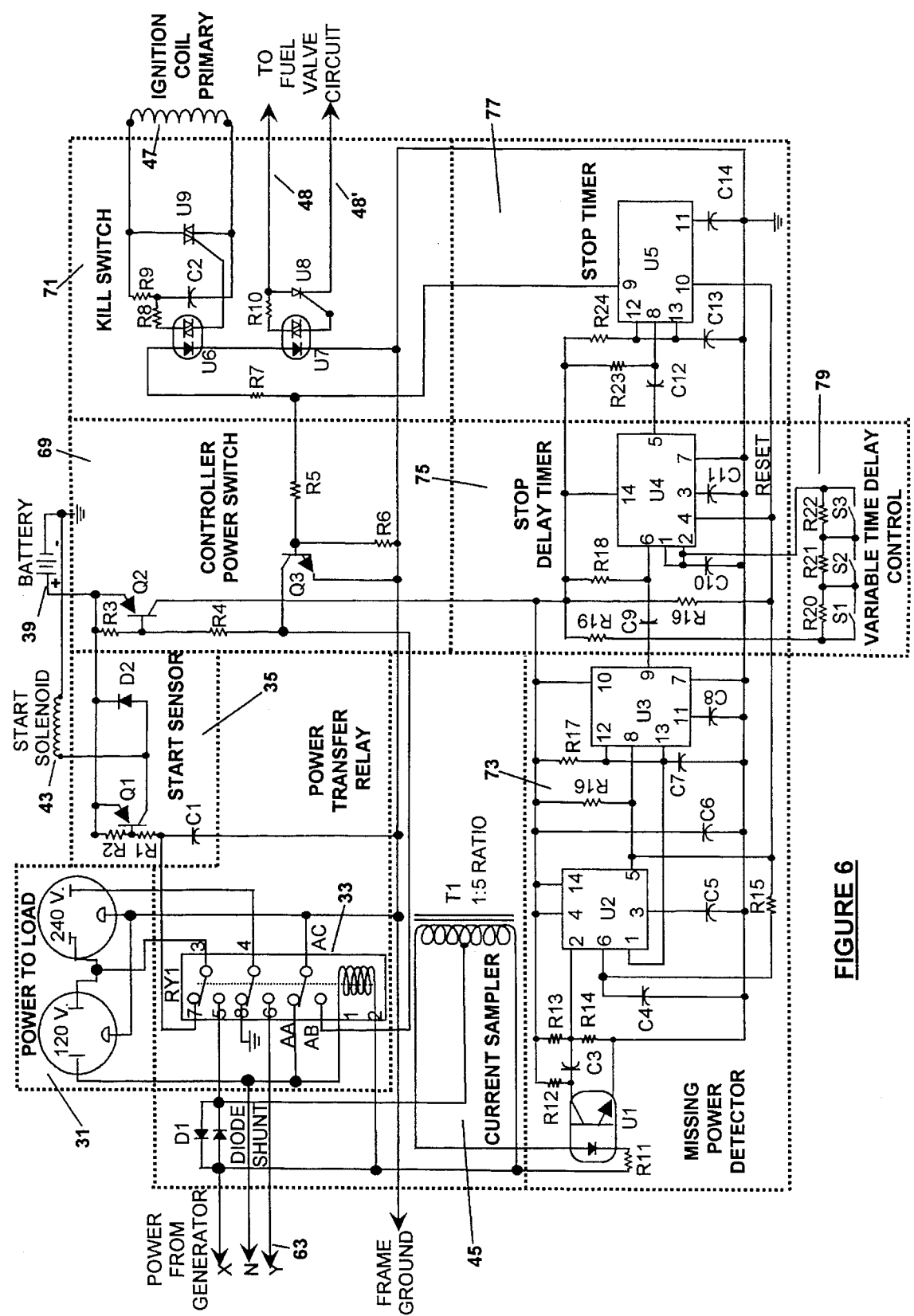
FIG. 6 is an electronic schematic diagram of the functioning of a second preferred embodiment of a controller according to the present invention using a diode shunt to sense current.

Current Sensing using a Diode Shunt as an Alternative to a Current Operated Switch As an alternate to sensing current with a current operated relay as shown in FIG. 5, a version of the controller has been developed using a diode as a current shunt, referencing FIG. 6. Except for the method of current sampling and the detection of loss of power flow, this version of the controller is identical with the first one described in connection with FIG. 5.

A diode is a nonlinear element in which the voltage across it changes very little as the current through it changes. From a few milliamperes to 25 amperes, the voltage drop across a diode changes from about 0.55 V to 0.8 V. For indicating the flow of AC current, a pair of diodes connected in parallel in opposite directions may be used. It was found that an excellent shunt which would serve the purpose of the controller according to the present invention could be made consisting of a 25 amp. full wave bridge rectifier with the + and − terminals connected together to form one terminal of the shunt, and the AC terminals connected together to form the other terminal. Connected in this manner it is equivalent to two diodes in parallel in each direction. This provides a convenient economical, easily available package that can be heat sunk. The output signal across the shunt is a power frequency square wave with rounded corners. In the embodiment of FIG. 6, the shunt diode is labeled D1.

Referring to FIG. 6, in this design, the voltage drop across the diode shunt D1 is coupled to the missing power detector 73 through a 1:5 step-up auto transformer T1 to an optical isolator U1. The optical isolator U1 serves to isolate the controller from the high voltage power. The transformer T1 is used to step up the voltage from the diode, which can be as low as 0.5 V, to a voltage which will operate the LED in optical isolator U1. This ratio is not critical as long as the output is large enough to operate the isolator LED.

If this signal can be detected with a "signal presence" or "power failure" detector, it will be known if there is a load present on the generator. One means of detecting the absence of power flow is to sense the loss of the AC waveform. The circuit used in this version of the controller is a modification of a power failure detector described by George Jung on Page 296 of his book, "IC Timer Cookbook", 2nd Edition, (Sams, 1990) In this circuit the input from the power flow sample is fed through the optical isolator U1. The output of U1 is fed to U2 which is an inverted one shot which produces a 2 ms negative output pulse every cycle of the 60 Hz power (16.67 ms). The output of U2 triggers a second one shot U3 which is retrigerable. The timeout period of U3 is greater than about 20 ms, so that as long as the 60 Hz power is present U2 produces 2 ms pulses for each cycle of the power frequency, the second one shot will retrigger each 16.67 ms and never time out. If the power sample disappears and U3 misses a pulse it will time out and its output will go low, indicating that the AC signal is absent and the power flow has stopped. When this happens its output triggers the stop delay timer 75.

By connecting the "reset" pins of U4 and U5 to the negative output of U2 and pulling it up to the + supply with a resistor R16, U4 and U5 are both reset and abort any timeout sequence as soon as U2 produces its first pulse after the load is again turned on, if this happens before the timeout of U4.

Figure 7:
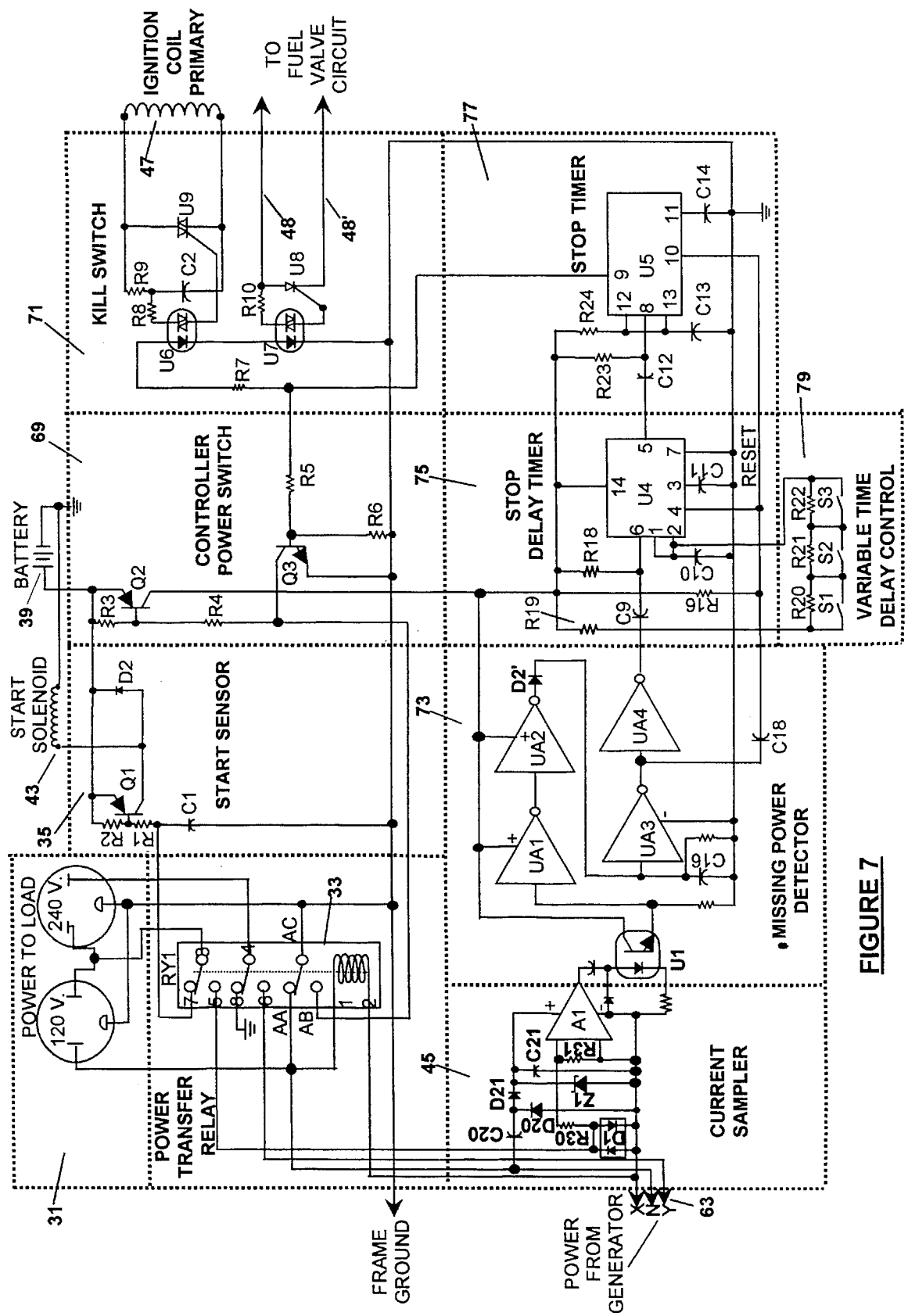
FIG. 7 is an electronic schematic diagram of the functioning of a third second preferred embodiment of a controller according to the present invention using a diode shunt to sense current without a transformer.

An Alternate Configuration using Diode Shunt Sensing which uses an Amplifier instead of a Transformer FIG. 7 shows a configuration in which an amplifier A1 is used in place of the transformer (T1 of FIG. 6) to increase the shunt voltage to a level which will operate the optical isolator U1. The common "ground" of the amplifier A1 is connected directly to the 120 V AC "hot" terminal "X", and so the amplifier A1 must be isolated from frame ground, as must its DC power supply. The power supply consists of a 0.47 Mf AC voltage dropping capacitor C20, two diodes D20 and D21, a zener diode Z1, and a filter capacitor C21. There is no IR loss in the voltage dropping capacitor C20 and consequently no dissipated heat.

The amplifier A1 is a fixed gain audio power amplifier so the gain is adjusted by the ratio of the input resistors R30 and R31. The output of the amplifier A1 drives the input LED of the optical isolator U1. The shunt diode pair is again shown as D1. The amplifier gain and current are adjusted so that there is an output from the phototransistor of U1 for only a small part of a cycle when the AC power is loaded with a minimum value. UA1 through UA4 are Schmidt trigger inverters. The output of the first and second inverters UA1 and UA2 is a pulse at line frequency. The diode D2' at the output of UA2 rectifies the pulse to charge C16. The time constant is set so that the input of UA3 is high all the time with a minimum AC load. The output of UA4 stays high with minimum and higher load. When the load is removed, it goes low and starts the timeout process. If however, the load returns before timeout of the stop delay timer, the output of UA3 goes low again, resetting both timers. The remainder of the system is the same as with the configuration of FIGS. 5 and 6.

I claim:

1. A controller for controlling the operation of an electric power generator as a function of load demand, comprising:

sensing means for sensing the presence and absence of a load on the electric power generator's output;

activating means for directly activating the electric power generator responsive to said sensing means sensing the presence of a load thereon;

stopping means for stopping operation of the electric power generator responsive to said sensing means sensing the absence of a load on the electric power generator; and timeout means, including a stop delay timer, for delaying initiation of the stopping operation of the electric power generator, in the absence of a load, for a predetermined length of time, permitting continuous operation of the electric power generator in the presence of short interruptions of load demand.

2. The controller as claimed in claim 1, wherein said timeout means includes adjustment means for selectively varying the delay time from the interruption of a load on the electric power generator until the stopping of the electric power generator by said stopping means.

3. The controller as claimed in claim 1, wherein said timeout means includes means for aborting initiating the stopping of the electric power generator if a load is reestablished on the output of the electric power generator before said delay time has expired.

4. The controller as claimed in claim 1, wherein said activating means includes connection/disconnection means to disconnect the neutral power output lead of the electric power generator from the ground connection of said controller and to isolate all power output leads of the electric power generator from said controller during the time said electric power generator is operating and supplying power to the load.

5. The controller as claimed in claim 1, wherein said sensing means comprises a current relay having a magnetic core coupled to wire leads connected between the electric power generator and the load, said current relay having an output coupled to a missing power detector, whereby, when current is interrupted in the delivery of power from the electric power generator to the load, said current relay ceases to detect current flow to the load, and said missing power detector deactivates said activating means to initiate deactivation of the electric power generator.

6. The controller as claimed in claim 1, wherein said sensing means comprises a diode shunt in series with one of the wire leads connected between the electric power generator and the load, said diode shunt being in parallel with the primary of a transformer whose output is monitored by a missing power detector, whereby, when current is interrupted in the delivery of power from the electric power generator to the load, said diode shunt ceases to have current flowing through it, and said transformer fails to provide output to said missing power detector which, in turn, deactivates said activating means to initiate deactivation of the electric power generator.

7. The controller as claimed in claim 1, wherein said sensing means comprises a diode shunt in series with one of the wire leads connected between the electric power generator and the load, said diode shunt being coupled to the input of an amplifier whose output is monitored by a missing power detector, whereby, when current is interrupted in the delivery of power from the electric power generator to the load, said diode shunt ceases to have current flowing through it, and said amplifier fails to provide output to said missing power detector which, in turn, deactivates said activating means to initiate deactivation of the electric power generator.

8. The controller as claimed in claim 1, comprising a battery, and said stopping means includes means for receiving power from said battery during a stop cycle which starts from initiation of said stopping means until the timeout period of said timeout means ends and the electric power generator ceases to output electric power.

9. A controller for controlling the operation of an electric power generator as a function of load demand, comprising:
sensing means for sensing the presence and absence of a load on the electric power generator's output; and
activating means for directly activating the electric power generator responsive to said sensing means sensing the presence of a load thereon; wherein
said activating means includes connection/disconnection means to disconnect the neutral power output lead of the electric power generator from the ground connection of said controller and to isolate all power output leads of the electric power generator from said controller during the time said electric power generator is operating and supplying power to the load.

10. The controller as claimed in claim 9, wherein
said sensing means comprises a current relay having a magnetic core coupled to wire leads connected between the electric power generator and the load, said current relay having an output coupled to a missing power detector, whereby, when current is interrupted in the delivery of power from the electric power generator to the load, said current relay ceases to detect current flow to the load, and said missing power detector deactivates said activating means to initiate deactivation of the electric power generator.

11. The controller as claimed in claim 9, wherein
said sensing means comprises a diode shunt in series with one of the wire leads connected between the electric power generator and the load, said diode shunt being in parallel with the primary of a transformer whose output is monitored by a missing power detector, whereby, when current is interrupted in the delivery of power from the electric power generator to the load, said diode shunt ceases to have current flowing through it, and said transformer fails to provide output to said missing power detector which, in turn, deactivates said activating means to initiate deactivation of the electric power generator.

12. The controller as claimed in claim 9, wherein said sensing means comprises a diode shunt in series with one of the wire leads connected between the electric power generator and the load, said diode shunt being coupled to the input of an amplifier whose output is monitored by a missing power detector, whereby, when current is interrupted in the delivery of power from the electric power generator to the load, said diode shunt ceases to have current flowing through it, and said amplifier fails to provide output to said missing power detector which, in turn, deactivates said activating means to initiate deactivation of the electric power generator.

13. A controller for controlling the operation of an electric power generator as a function of load demand, comprising:
sensing means for sensing the presence and absence of a load on the electric power generator's output; and
activating means for directly activating the electric power generator responsive to said sensing means sensing the presence of a load thereon; wherein
said sensing means comprises a missing power detector and a current relay having a magnetic core coupled to wire leads connected between the electric power generator and the load, said current relay having an output coupled to said missing power detector, whereby, when current is interrupted in the delivery of power from the electric power generator to the load, said current relay ceases to detect current flow to the load, and said missing power detector deactivates said activating means to initiate deactivation of the electric power generator.

14. The controller as claimed in claim 13, wherein the wire leads connected between the electric power generator and the load comprise a pair of AC conductors and are looped through said magnetic core in different directions.

15. The controller as claimed in claim 13, wherein said missing power detector comprises amplifier means to condition the output of said current relay for input to said activating means.

16. A controller for controlling the operation of an electric power generator as a function of load demand, comprising:
sensing means for sensing the presence and absence of a load on the electric power generator's output; and
activating means for directly activating the electric power generator responsive to said sensing means sensing the presence of a load thereon; wherein
said sensing means comprises a diode shunt in series with one of the wire leads connected between the electric power generator and the load, said diode shunt being in parallel with the primary of a transformer whose output is monitored by a missing power detector, whereby, when current is interrupted in the delivery of power from the electric power generator to the load, said diode shunt ceases to have current flowing through it, and said transformer fails to provide output to said missing power detector which, in turn, deactivates said activating means to initiate deactivation of the electric power generator.

* * * * *